(12) United States Patent
Jaeger et al.

(10) Patent No.: US 10,599,967 B2
(45) Date of Patent: Mar. 24, 2020

(54) RFID LABEL WITH PROTECTION OF THE RFID FUNCTION

(71) Applicant: Schreiner Group GmbH & Co. KG, Oberschleissheim (DE)

(72) Inventors: Maximilian Jaeger, Munich (DE); Sabine Krueger, Munich (DE); Christian Kuczera, Munich (DE); Dirk Probian, Meitingen (DE); Arne Rehm, Munich (DE); Gerhard Ross, Fuerstenfeldbruck (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 0 days.

(21) Appl. No.: 16/136,710

(22) Filed: Sep. 20, 2018

(65) Prior Publication Data

US 2019/0095773 A1    Mar. 28, 2019

(30) Foreign Application Priority Data

Sep. 22, 2017    (DE) .......................... 10 2017 122 052

(51) Int. Cl.
     *G06K 19/06*      (2006.01)
     *G06K 19/077*      (2006.01)

(52) U.S. Cl.
     CPC ..... *G06K 19/07728* (2013.01); *G06K 19/077* (2013.01); *G06K 19/0776* (2013.01)

(58) Field of Classification Search
     CPC ........... G06K 17/0025; G06K 17/0029; G06K 19/06046; G06K 19/07

USPC ....................... 235/492, 487, 462.46, 472.02
See application file for complete search history.

(56) References Cited

U.S. PATENT DOCUMENTS

| 6,147,604 | A | 11/2000 | Wiklof et al. |
|---|---|---|---|
| 6,667,092 | B1 | 12/2003 | Brollier et al. |
| 8,640,962 | B2 | 2/2014 | Charrin |
| 2008/0295318 | A1 | 12/2008 | Bohn |
| 2009/0305635 | A1 | 12/2009 | Osamura et al. |
| 2014/0239474 | A1* | 8/2014 | Pueschner ............... H01L 21/50 257/690 |
| 2016/0048750 | A1 | 2/2016 | Matsumura |
| 2016/0071002 | A1 | 3/2016 | Matsumura et al. |
| 2018/0018548 | A1* | 1/2018 | Droz ................ G06K 19/07745 |

FOREIGN PATENT DOCUMENTS

| DE | 10 2006 047 714 A1 | 10/2007 |
|---|---|---|
| DE | 10 2008 021 231 A1 | 11/2009 |
| DE | 20 2016 101 000 U1 | 4/2016 |
| EP | 1 594 082 A1 | 11/2005 |
| EP | 1 562 140 B1 | 6/2010 |
| EP | 2 626 814 A1 | 8/2013 |
| JP | 2006/146521 A | 6/2006 |

(Continued)

*Primary Examiner* — Daniel St Cyr
(74) *Attorney, Agent, or Firm* — Collard & Roe, P.C.

(57) ABSTRACT

An RFID label with protection of the RFID function includes an RFID transponder chip and a carrier substrate, on which the RFID transponder chip is disposed. Furthermore, at least one structure element in vertical projection is disposed laterally offset from the RFID transponder chip. The at least one structure element acts as a spacer and, in case of an external mechanical stress, prevents a direct force action on the transponder chip and a junction to an attached antenna structure.

15 Claims, 6 Drawing Sheets

(56) References Cited

FOREIGN PATENT DOCUMENTS

| WO | 2005/109331 A1 | 11/2005 |
| WO | 2008065278 A2 | 6/2008 |
| WO | 2009109923 A1 | 9/2009 |

* cited by examiner

RFID LABEL WITH PROTECTION OF THE RFID FUNCTION

CROSS REFERENCE TO RELATED APPLICATIONS

Applicant claims priority under 35 U.S.C. § 119 of German Application No. 10 2017 122 052.6 filed Sep. 22, 2017, the disclosure of which is incorporated by reference.

BACKGROUND OF THE INVENTION

1. Field of the Invention

The invention relates to an RFID chip with protection of the RFID function, especially with a protective function for an RFID transponder chip subject to mechanical stress on the RFID label.

2. Description of the Related Art

An RFID chip comprises an RFID inlay having an RFID transponder chip, to which an antenna structure is attached. In an RFID label, the transponder chip and its connection to the antenna are those points that react most sensitively to mechanical stresses. During the processing of RFID labels, pressure is exerted on these points by deflecting and pressing rolls of a processing machine, among other factors.

When the RFID label is attached, after its manufacture, to the body to be labeled, the risk exists that the transponder chip will be damaged by mechanical force action or that the connection between the antenna structure and the transponder chip will be broken due to mechanical stress. Usually it is the adhesive comprising the bonding material between the chip and the antenna structure that breaks in such cases. Especially in the case of an RFID label that is designed as a wraparound label and is pasted onto a vessel, for example a cylindrical container, an ampoule, a vial, a syringe or another storage vessel for a medicinal substance, damage to the RFID transponder chip or respectively the connection to the antenna structure may likewise be suffered due to the contact of vessels rubbing directly against one another.

One option for protection of the electronic functionality of an RFID label consists in providing a protective coating in the form of a lacquer (lacquer dome) directly on the transponder chip. However, such a lacquer dome often offers only inadequate protection for the chip, since only a small part of the mechanical stress is dissipated and the additional stiffening is disadvantageous on curved surfaces. Furthermore, a specific additional pass through the machine is required for covering the chip of the RFID inlay.

For protection of the RFID transponder chip, a countersunk space via which the chip of the inlay lies during pasting of the label may be provided in a part or respectively vessel to be adhesively bonded. In such a solution, it is disadvantageous that the part or respectively vessel to be adhesively bonded must be specially adapted because of the countersunk space. Such a form of configuration is therefore poorly flexible, and often the modified parts or respectively vessels no longer conform with the specified standards. Due to the recess in the material, it is inevitable that material weaknesses will develop. In addition, tensions may develop. The material weaknesses and tensions ultimately lead to increased outages in the production of the parts or respectively vessels.

SUMMARY OF THE INVENTION

One motive for the present invention is to specify an RFID label with protection of the RFID function, in which the RFID transponder chip and the junction from the antenna structure to the RFID transponder chip are protected as well as possible from damage due to mechanical stresses during the processing, the attachment and/or the use of the label.

An embodiment of an RFID label in accordance with the invention with protection of the RFID function from a damage due to a mechanical stress is discussed below.

The RFID label comprises an RFID transponder chip and a carrier substrate, on which the RFID transponder chip is disposed. Beyond this, the RFID label is provided with at least one structure element, wherein, in vertical projection toward the RFID transponder chip, the at least one structure element is disposed laterally offset relative to the RFID transponder chip.

A vertical projection is to be understood in the following as an overhead view of the RFID label and what is then to be regarded as a transparent view through the individual courses of the label, wherein only the RFID transponder chip and the structure elements are visible. In such a vertical projection, the least one structure element is disposed not coincidingly above the RFID transponder chip, but instead is offset laterally or respectively in horizontal direction relative to the RFID transponder chip.

Besides the carrier substrate, the RFID label may be provided with at least one further foil course. The at least one structure element may be disposed on the carrier substrate or on the at least one further foil course. Within the foil structure of the RFID label, the at least one further foil course may be disposed above the carrier substrate and thus above the RFID transponder chip. The at least one further foil course may be provided on its upper side, for example, with an inscription. The at least one structure element may be disposed on the upper side or an underside of the at least one further foil course. If the foil structure is provided with more than one further foil course, the at least one structure element may be disposed between two foil courses. The RFID label may be designed in particular as a wraparound label.

The at least one structure element may be designed, for example, as a printed dot, a line, a semicircle, a circle, a square or rectangle, or else may have some other geometric basic shape. If the RFID label is provided with several structure elements, they may be designed as printed dots, lines, semicircles, circles, squares, rectangles or some other geometric basic shapes. The at least one structure element may be formed from a lacquer, for example a haptic lacquer. Such a haptic lacquer is usually used to provide, on a label, a raised structure as identification, which may be sensed by feel. The at least one structure element may also be formed, for example, from cured adhesive.

In vertical projection, the at least one structure element is disposed spaced apart from the RFID transponder chip in the foil structure of the RFID label. If the RFID label is provided with several structure elements, the structure elements are also disposed spaced apart from one another on the corresponding foil course on which they are applied.

In vertical projection toward the transponder chip, the structure element or structure elements, may be disposed at a spacing around the transponder chip, for example in a pattern. These spacings ensure that the transponder chip, despite the positioning tolerances that exist during the manufacture, is always surrounded by the structure element or elements, especially when the label is designed as a wraparound label and is pasted onto a round body. In vertical projection, the RFID chip may be surrounded on all sides or only on some sides by the structure element or elements.

In a vertical projection from above onto the RFID label, the at least one structure element is disposed in such a way around the position of the transponder chip that any mechanical pressure, for example a force that acts from above on the RFID label, is absorbed by the at least one structure element itself, i.e. beside the chip and thus at uncritical points. The positioning of the at least one structure element is then achieved in such a way that the at least one structure element absorbs the mechanical pressure instead of the transponder chip, even when the label is designed as a wraparound label and is bent around a narrow radius for pasting onto a round body, for example a small bottle. By wrapping a vessel with the label, the chip and the at least one structure element become disposed one above the other in such a way that the protective function is assured.

The at least one structure element acts as a spacer relative to an external device, for example pressing or deflecting rolls of a processing machine, over which the label is guided during manufacturing or application. The at least one structure element may also act as a spacer relative to a foil course of the RFID label disposed above it.

The at least one structure element may be disposed, for example, on the carrier substrate at a spacing from the transponder chip. When the label comprises several structure elements, these may be disposed spaced apart from one another. The structure element or elements acting as spacers ensure that the RFID transponder chip does not come into contact with the externally acting source of stress (e.g. deflecting or pressing roll) in the case of a mechanical stress from above on the label, so that the forces acting on the label are kept far away from the transponder chip and the attached portions of the antenna structure. The geometric shape and the spacings of the at least one structure element and if applicable the spacings of several structure elements relative to one another are to be selected such that the externally acting stressing devices do not come into contact with the RFID transponder chip and if applicable the junction between transponder chip and antenna structure.

The at least one structure element may be disposed at sufficient height on the carrier substrate or on the upper side or underside of the one further foil course. According to one possible embodiment, the at least one structure element is twice as high, for example, as the transponder chip. The shape and the position of the structure element or elements are adaptable exactly to the RFID inlay, to the subsequent processing (e.g. application of the label onto the vessel) and to the application or use in the condition applied on the labeled vessel.

The at least one structure element is applied, for example, by means of a printing process on one of the layers/foil courses of the RFID label. The printing of the at least one structure element may be achieved in the same run as the printing of the actual (graphical) printed pattern of the label. Thereby the costs during manufacture may be reduced. In particular, since the at least one structure element is printed, there is also no need for any additional material layer, which would otherwise have to be disposed, for example, as a protective layer over the entire surface of the RFID transponder chip. On the one hand, this reduces the costs of manufacturing of the label and on the other hand it ensures that the label has a small height. The small height of the label is of advantage in particular when the RFID label is designed as a wraparound label, which by virtue of its small height can be wrapped round narrow radii and nevertheless provides a protection for the RFID function.

Besides the formation of the at least one structure element as a printed lacquer or adhesive dot, the at least one structure element may be configured, according to further embodiments, as a thin plastic, rubber/caoutchouc or cork platelet, for example. Such structure elements could be applied, for example in dispensing operation, on one of the courses of the RFID label.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
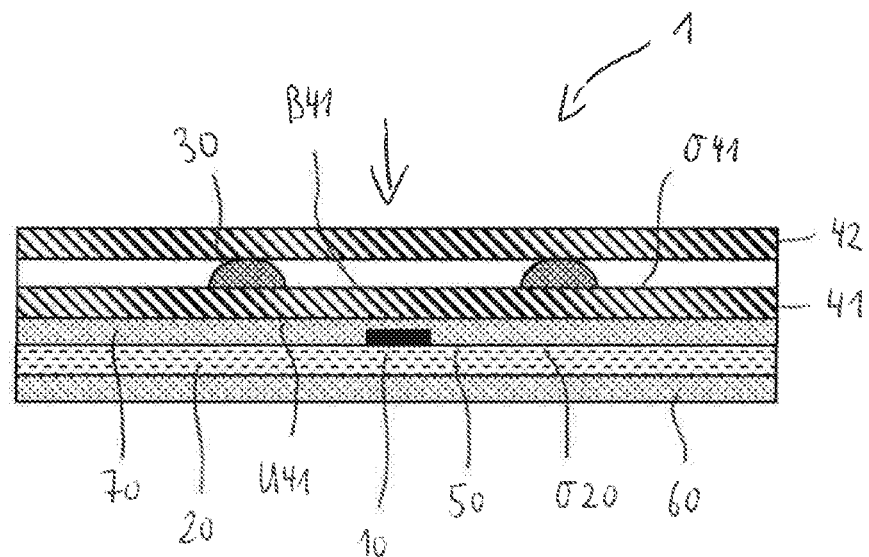
FIG. 1 shows a cross section through an embodiment of an RFID label with protection of the RFID function using structure elements as spacers between two foil courses for protection of the RFID function.

According to the embodiment shown in FIG. 1, the RFID label 1 with protection of the RFID function against a mechanical stress comprises an RFID transponder chip 10, which is disposed on an upper side O20 of a carrier substrate 20. An antenna structure 50 is attached to the transponder chip 10. The arrangement comprising the RFID transponder chip, the antenna structure and the carrier substrate form the RFID inlay. On its underside, the RFID label has an adhesive layer 60 for pasting the label onto an object.

The RFID label 1 is provided with a first foil course 41 and at least one second foil course 42, wherein the at least one second foil course 42 is disposed above the first foil course 41. Furthermore, the label comprises structure elements 30, which are disposed between the first foil course 41 and the at least one second foil course 42. The adhesive layer 60 is disposed under the RFID inlay or respectively under the first foil course 41. The first foil course 41 is disposed above the carrier substrate 20 and above the RFID transponder chip 10 as well as the antenna structure 50. The carrier substrate 20 with the transponder chip 10 and the antenna structure 50 is pasted by means of an adhesive layer 70 onto an underside of the first foil course 41.

The structure elements 30 are disposed directly on the first foil course 41. They are disposed on an upper side O41 of the first foil course 41. The structure elements 30 are designed and disposed in such a way that at least one region B41 of the first foil course 41, which is situated between the structure elements 30, is disposed spaced apart from the at least one second foil course 42. The structure elements 30 are designed and disposed in particular in such a way that the at least one second foil course 42 is disposed above the region B41 of the first foil course 41 at a spacing that is determined by the height of the structure elements 30.

The structure elements 30 are therefore disposed as spacers on the surface O41 of the first foil course 41. In the case of a mechanical stress according to the direction of the arrow indicated in FIG. 1 from above onto the RFID label, the structure elements prevent an external force, for example due to a deflecting or pressing roll or due to other objects from being able to act directly on the RFID transponder chip and on the junction between the transponder chip and the antenna structure.

According to one possible embodiment, the structure elements are able to prevent the at least one second foil course 42 from being pressed onto the region B41 of the first foil course 41 and therefore a pressure from developing on the transponder chip 10 or respectively the attached antenna structures 50.

Figure 2A:
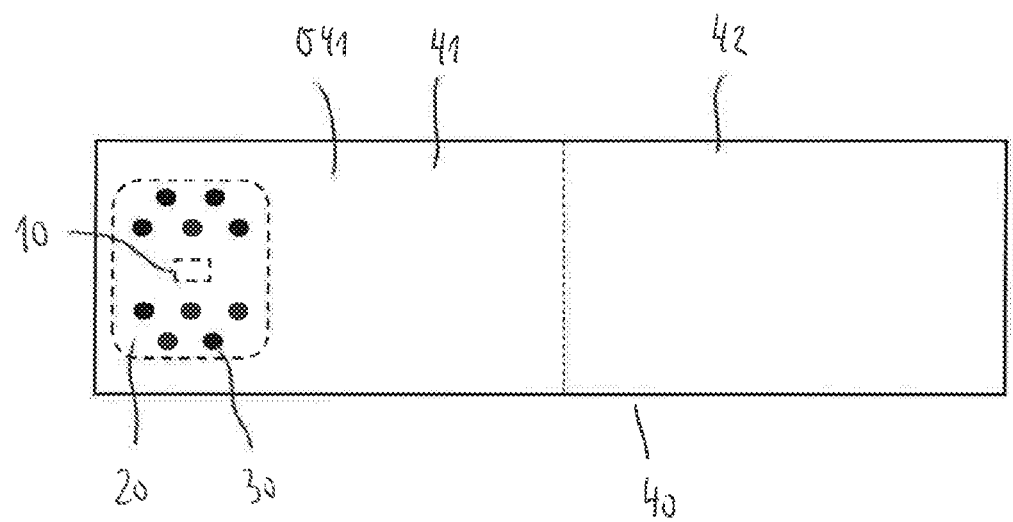
FIG. 2A shows an overhead view of an embodiment of an RFID label as a wraparound label with protection of the RFID function using structure elements on a portion of a foil course for protection of the RFID function.

FIG. 2A shows an embodiment of the RFID label 1, which is designed as a wraparound label for pasting onto a round body. The RFID label comprises a foil course 40 with a first portion 41 and a second portion 42, which is adjoined in longitudinal direction of the label 1 to the first portion 41. Both the first portion 41 and the second portion 42 may be provided on their upper side with an inscription. The structure elements 30 are disposed on an upper side O41 of the first portion 41 of the at least one foil course 40. The transponder inlay with the transponder chip 10, the antenna structure 50 and the carrier substrate 20 is disposed on an underside of the portion 41 of the foil course 40. In the embodiment shown in FIG. 2A, the structure elements 30 are disposed on a leading part of the label. In vertical projection, the transponder inlay is disposed on the underside of the portion 41 of the foil course, underneath the structure elements 30. The position of the transponder inlay with the transponder chip 10 is indicated by dashed lines in FIG. 2A.

Figure 2B:
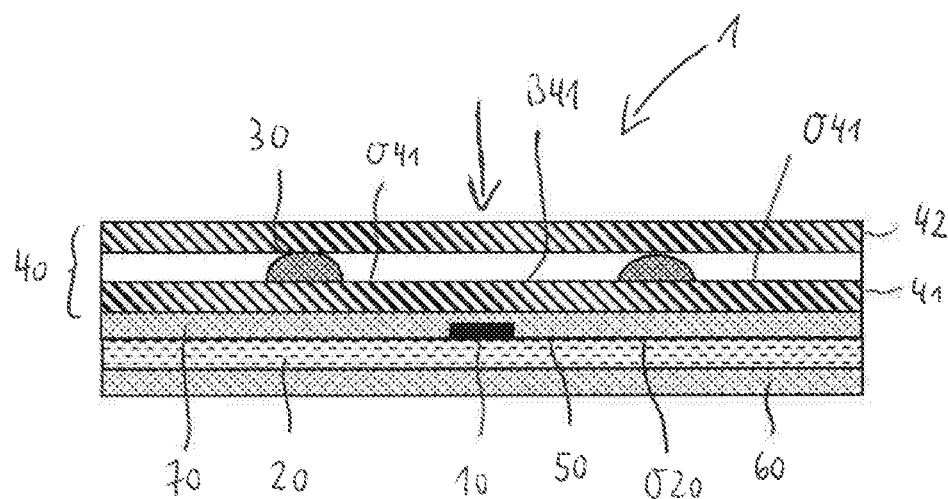
FIG. 2B shows a cross section through the embodiment of the RFID label of FIG. 2A after the pasting onto a round body.

FIG. 2B shows the individual courses of the RFID label disposed one above the other after the application of the wraparound label onto a round body. The transponder inlay with the transponder chip 10, the carrier substrate 20 and the antenna structure 50 is disposed on the underside U41 of the portion 41 of the foil course 40. The structure elements 30 are disposed on the upper side O41 of the portion 41 of the foil course 40 and are covered by the portion 42 of the foil course 40 after the wrapping of the RFID label around the round body. The wraparound label is designed such that the second portion 42 of the at least one foil course 40 is disposed above the first portion 41 of the foil course 40 after the pasting of the wraparound label 1 onto the round body. After the pasting of the wraparound label onto a round body, the first portion 41 is hidden by the second portion 42 disposed above it.

The structure elements 30 are designed such that an external force, for example a force that acts on the label due to a deflecting or pressing roll or due to other objects, is not able to act directly on the RFID transponder chip and on the junction between the transponder chip and the antenna structure.

According to one possible embodiment, the structure elements may in particular be designed and disposed on the upper side O41 of the portion 41 of the foil course 40 in such a way that at least one region B41 of the first portion 41 of the foil course 40, which is situated between the structure elements 30, is disposed spaced apart from the second portion 42 of the at least one foil course 40 after the pasting of the wraparound label 1 onto a round body. The structure elements 30 are designed and disposed in particular in such a way that the second portion 42 of the foil course 40 is disposed, after the pasting of the wraparound label 1 onto the round body, above the region B41 of the first portion 41 of the foil course 40 at a spacing that is determined by the height of the structure elements 30.

It is only by the wrapping of a vessel with the label that the transponder chip 10 and the structure elements 30 are disposed one above the other such that a protective function of the transponder chip 10 and of the adjoining antenna structure 50 is assured. In the region B41 between the structure elements, the structure elements act as spacers and thus prevent, in the case of a force action in arrow direction, a mechanical stress from being exerted on the transponder chip 10 and on the junction between the transponder chip and the attached antenna structure 50. According to one improvement, the structure elements are able to prevent the portion 42 of the foil course 40 from being pressed onto the portion 41 and thus onto the transponder chip 10.

Figure 3:
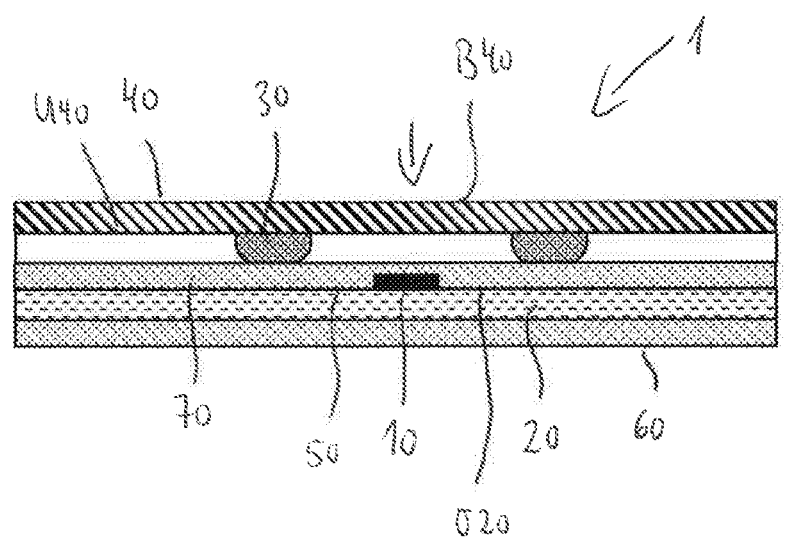
FIG. 3 shows a cross section through an embodiment of an RFID label with protection of the RFID function using structure elements on an underside of a foil course for protection of the RFID function.

FIG. 3 shows a cross section through a further embodiment of the RFID label 1 with protection of the RFID function. The RFID chip 1 comprises the transponder chip 10 with the attached antenna structure 50. The transponder chip 10 and the antenna structure 50 are disposed on the upper side O20 of a carrier substrate 20 and form the transponder inlay. A foil course 40 is disposed above the carrier substrate 20 or respectively the transponder chip 10 and the adjoining antenna structure 50. Structure elements 30 are disposed on an underside U40 of the foil course 40. For pasting of the RFID label onto an object, the underside of the carrier substrate 20 is coated with an adhesive layer 60. The foil course 40 is pasted by means of a further adhesive layer 70 onto the carrier substrate 20.

According to one possible embodiment, the structure elements may be disposed in such a way that a region B40 of the foil course 40, which is situated between the structure elements 30, is disposed at a spacing from the RFID transponder chip 10. This spacing is determined by the height of the structure elements 30. In the region B40 between the structure elements 30, the foil course 40 is disposed spaced apart from the carrier substrate 20 and respectively the transponder chip 10 and the adjoining antenna structure 50.

In the embodiment of the RFID label shown in FIG. 3, the structure elements 30 are disposed on the underside U40 of the foil course 40 and designed in such a way that, in case of an external force action on the RFID label, no direct force action takes place on the transponder chip and the junction between transponder chip and antenna. The structure elements 30 may be designed and disposed in particular in such a way that, in case of a force action in arrow direction, meaning from above, on the foil course 40, the region B40 is held by the structure elements 30 at a spacing from the transponder chip 10 and the attached antenna structure 50. Thus external mechanical stresses cannot act directly on the transponder chip 10 and the attached antenna structure 50.

Figure 4A:
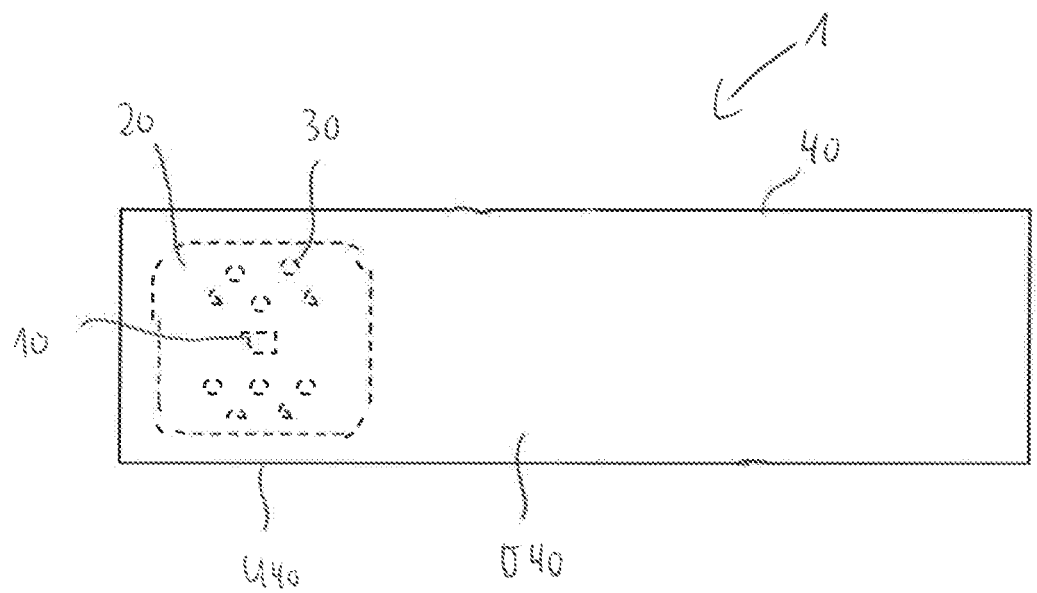
FIG. 4A shows an overhead view of an embodiment of an RFID label as a wraparound label with protection of the RFID function using structure elements on an underside of a portion of a foil course for protection of the RFID function.

FIG. 4A shows an overhead view of an embodiment of the RFID label 1, which is designed as a wraparound label for pasting onto a round body. The RFID label comprises a carrier substrate 20, on the surface of which the transponder chip 10 with the attached antenna structure is disposed. The RFID label comprises a foil course 40, on the surface O40 of which an inscription can be applied. Structure elements 30 are disposed on the underside U40 of the foil course 40. The transponder inlay is disposed on the underside U40 of the foil course 40 in such a way that the structure elements 30 are overlaid by the carrier substrate 20. The position of the transponder inlay with the transponder chip 10 on the underside of the foil course 40 is indicated by dashed lines in FIG. 4A.

Figure 4B:
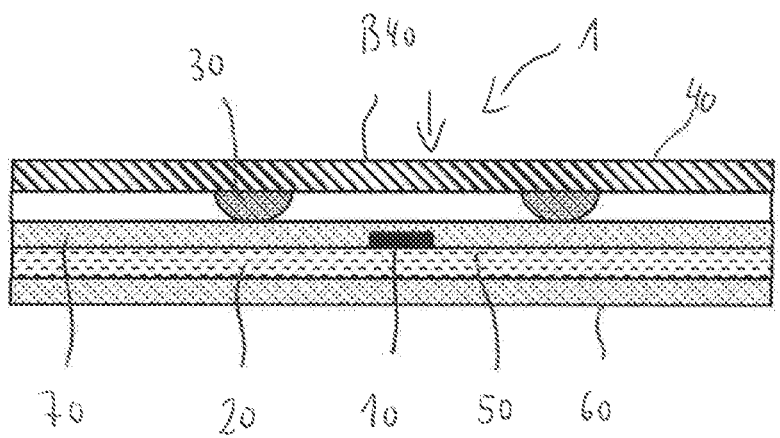
FIG. 4B shows a cross section through the embodiment of the RFID label of FIG. 4A after the pasting onto a round body.

FIG. 4B shows the wraparound label 1 of FIG. 4A after the pasting onto a round body. The wraparound label is pasted with an adhesive layer 60 disposed on its underside onto a round body, not illustrated in FIG. 4B. The structure elements 30 are designed as spacers and, in the case of a mechanical stress, prevent a force, for example, which acts from the upper side O40 of the foil course 40 on the RFID label, from being transferred directly to the transponder chip 10 and the attached antenna structure 50.

According to one possible embodiment, the structure elements 30 are disposed in such a way that a region B40 of the foil course 40, which is situated between the structure elements 30, is disposed at a spacing from the RFID transponder chip 10 after the pasting of the wraparound label 1 onto the round body. This spacing is determined by the height of the structure elements 30.

Figure 5A:
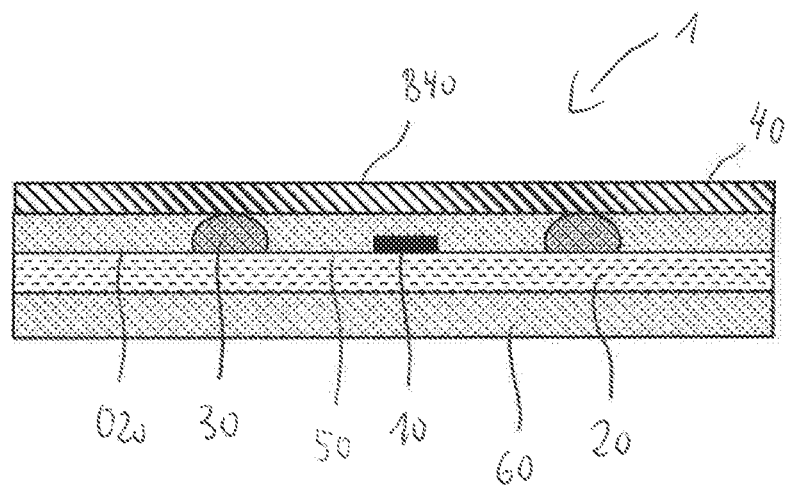
FIG. 5A shows a cross section through an embodiment of an RFID label with structure elements on a carrier substrate for an RFID transponder chip for protection of the RFID function.

FIG. 5A shows a cross section through a further embodiment of an RFID label 1 with protection of the transponder functionality. In the embodiment of the RFID label illustrated in FIG. 5A, the structure elements 30 are disposed directly on an upper side O20 of the carrier substrate 20, in contrast to the embodiment shown in FIG. 3.

Figure 5B:
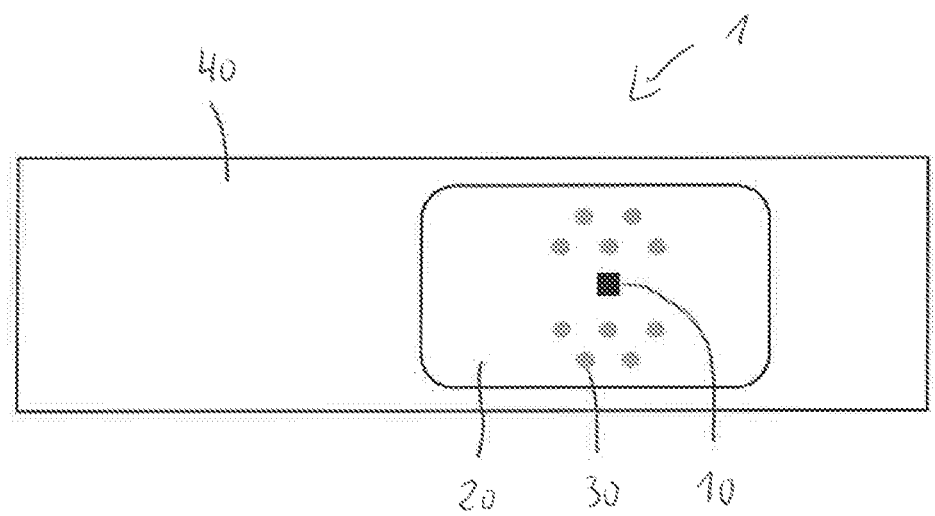
FIG. 5B shows an overhead view of an RFID label with protection of the RFID function using structure elements on a carrier substrate for protection of the RFID function.

FIG. 5B shows an overhead view of an underside U40 of the foil course 40, on which the transponder inlay with the carrier substrate 20, the transponder chip 10 and the antenna structure, not shown, is disposed. The RFID transponder chip 10 and the antenna structure are disposed together with the structure elements 30 on the upper side of the carrier substrate 20. The structure elements are designed in such a way that a direct external force effect, for example from a fabrication machine or another object, on the transponder chip or the junction to the antenna structure is prevented by them. The transponder chip and the antenna structure attached to it are therefore protected by the structure elements from a mechanical damage.

According to one embodiment, the structure elements 30 are designed and disposed on the carrier substrate 20 in such a way that the foil course 40 is disposed above the RFID transponder chip 10 at a spacing that is determined by the height of the structure elements 30. The structure elements 30 are formed on the carrier substrate 20 as spacers, which hold the foil course 40 at a spacing above the RFID transponder chip 10, especially when a mechanical stress acts on the RFID label from above in the direction of the foil course 40.

The RFID label shown in FIGS. 5A and 5B may be designed as a wraparound label for pasting onto a round body. In this case, the foil course 40 is laid in several courses if necessary above the structure elements 30 during labeling of the round body. The structure elements prevent parts of a fabrication machine or parts of other objects from coming directly into contact with the transponder chip and the junction to the antenna.

According to one possible embodiment, the structure elements in the condition of the label pasted onto the round body are able to act in the region B40 as spacers between the transponder structures and the foil course 40 disposed above them, if necessary in several courses. During exertion of a force from above on the foil course 40, the structure elements 30 prevent the region B40 of the foil course 40 with the transponder chip 10 or respectively the antenna structure attached to it from coming into contact and the transponder inlay from being damaged.

Figure 6:
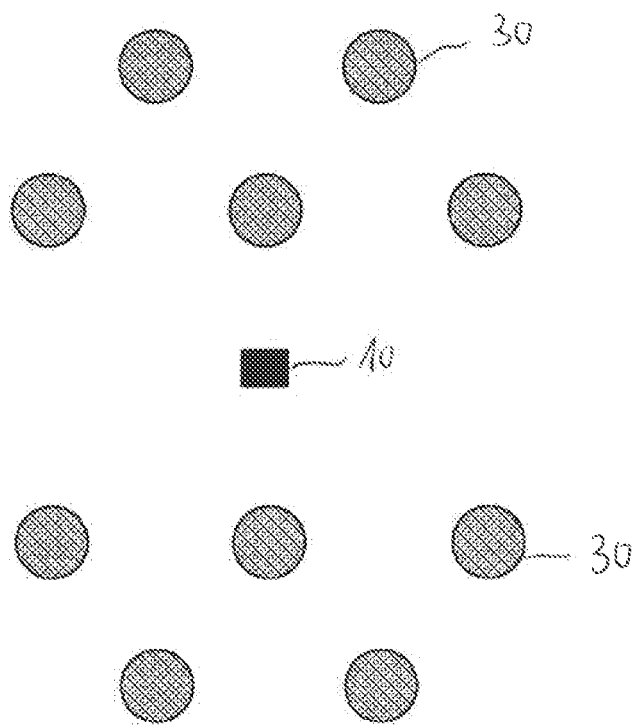
FIG. 6 shows an enlarged diagram of a vertical projection onto a region of the RFID label with the RFID transponder chip and dot-shaped structure elements.

FIG. 6 shows a vertical projection from above, onto the RFID label, of the embodiments shown in FIGS. 1 to 5B. For simplicity, only the transponder chip 10 as well as the structure elements 30 are shown in the vertical projection. For all embodiments of the RFID label, the structure elements 30 in the vertical projection are disposed laterally or respectively horizontally offset relative to the RFID transponder chip 10. The transponder chip 10 and the structure elements 30 may be disposed on different foil courses of the RFID label, as shown in FIGS. 1 to 4B. The transponder chip 10 and the structure elements 30 may also be disposed on the same foil course, i.e. on the carrier substrate 20, as shown in FIGS. 5A and 5B.

In the vertical projection, the structure elements 30 are disposed in particular in such a way around the position of the transponder chip 10 that an external force action, in which the force is exerted from above onto the RFID label, is absorbed by the structure elements 30. Thereby a pressing force on the label is prevented from being exerted directly on the transponder chip 10 or respectively on the junction to the antenna structure 50 attached to the transponder chip. Thus the structure elements act as spacers, which keep devices acting on the label, for example deflecting or pressing rolls of a processing device, or also objects on which the RFID label is applied, away from the RFID transponder chip and the junction to the attached antenna structure.

The structure elements may have a certain compressibility, wherein it is ensured, however, that components of a fabrication machine, for example deflecting and pressing rolls or other objects, do not come directly into contact with the transponder chip and the junction to the antenna structure, so that the function of the structure elements as spacers relative to the components of the fabrication machine remains preserved. For example, the structure elements may have a spacing relative to the transponder chip and the junction to the antenna structure that ensures that the components of the fabrication device or other objects indeed come into contact with the structure elements themselves but not with the transponder chip and the junction to the antenna structure. According to one possible embodiment, at least the outer of the foil courses disposed above the transponder chip does not come into contact with the the transponder chip during a force action on the RFID label.

In vertical projection, the transponder chip 10 may be disposed on the carrier substrate 20, for example at a central position between the structure elements 30. In vertical projection, the structure elements 30 are disposed spaced apart from the transponder chip 10. Beyond this, the structure elements 30 are disposed spaced apart from one another. In vertical projection, for example, the structure elements 30 may be disposed around the transponder chip 10 in a pattern that is point-symmetric or non-symmetric. The structure elements 30 form a patterned height profile on the foil course on which they are disposed.

The spacings ensure that the transponder chip, despite the positioning tolerances that exist during the manufacture of the RFID label, is surrounded by the structure elements 30. The structure elements 30 may be constructed, for example, as drop-shaped or dot-shaped or approximately dot-like individual elements. The structure elements may be formed from a lacquer, for example a haptic lacquer, which is applied on the foil course 40 or on the foil course 41 or on the carrier substrate 20.

In vertical projection, the structure elements 30 may be disposed on the label in a manner completely or only partly around the transponder chip. As in the embodiments shown in the figures, the structure elements, in vertical projection, may be disposed only at two opposite sides of the transponder chip 10. For example, in vertical projection, the structure elements may be disposed spaced apart from the transponder chip in one or more rows. In vertical projection in the shown embodiments, respectively five structure elements 30 are disposed on one side of the transponder chip 10 and five further structure elements 30 on an opposite side of the transponder chip 10.

In all embodiments shown in FIGS. 1A to 5B, the structure elements 30 may be disposed on the upper side or underside of the foil course 40, 41 or on the upper side of the carrier substrate 20 in a printing process (e.g. screen printing or inkjet printing) or by means of an adhesive-application process (e.g. dispensing). The height of the individual structure elements 30 is to be designed such that the transponder chip and the adjoining antenna structure are protected from an acting external force in dependence on the mechanical stress to be expected. For example, the structure elements 30 may have a height that is greater than the height of the RFID transponder chip 10. For example, the structure elements may be twice as high as the transponder chip 10.

Since the structure elements 30 may be applied during a printing process, the printing of the structure elements 30 may be achieved in the same run as the printing of the actual printed pattern of the RFID label. Thereby an additional process step during the manufacture of the label is unnecessary.

It is also possible, however, to use thin platelets of plastic, rubber, caoutchouc or cork instead of printed structure elements. These platelets may be disposed, in the embodiment shown in FIG. 1, on an upper side of the foil course 41, or respectively, in the embodiment shown in FIGS. 2A and 2B, on an upper side of the portion 41 of the foil course 40. In the embodiments shown in FIGS. 3, 4A and 4B, the platelets are disposed on an underside of the foil course 40. In the embodiment shown in FIGS. 5A and 5B, the platelets are disposed on an upper side of the carrier substrate 20. In the configuration of the structure elements in the form of thin platelets, the structure elements may be applied in dispensing operation on the corresponding courses of the RFID label.

Figure 7A:
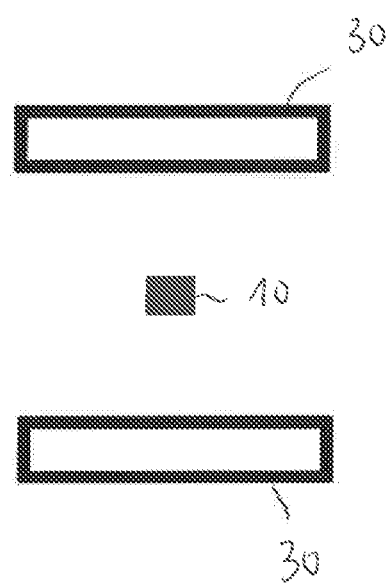
FIG. 7A shows an enlarged diagram of a vertical projection onto a region of the RFID label with the RFID transponder chip and rectangular structure elements.
Figure 7B:
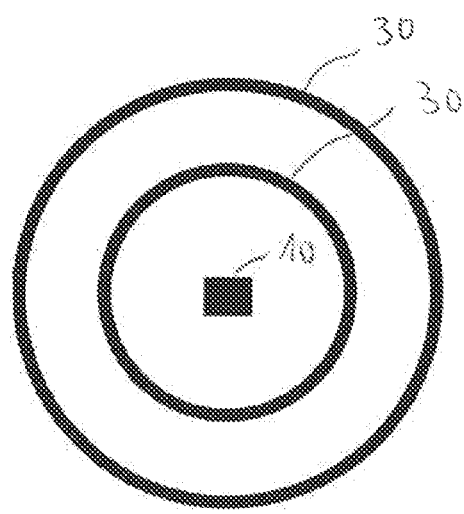
FIG. 7B shows an enlarged diagram of a vertical projection onto a region of the RFID label with the RFID transponder chip and circular structure elements.
Figure 7C:
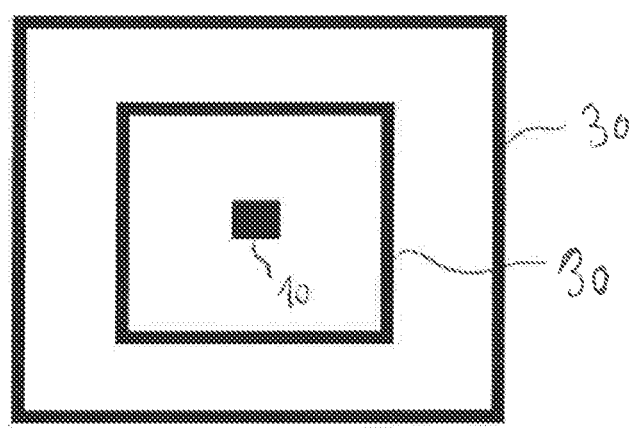
FIG. 7C shows an enlarged diagram of a vertical projection onto a region of the RFID label with the RFID transponder chip and frame-shaped structure elements.

FIGS. 7A, 7B and 7C show overhead views in the direction of transparent views through an RFID label, i.e. a vertical projection onto an RFID label, wherein only the spatial location of the at least one structure element 30 relative to the RFID transponder chip 10 is illustrated. The antenna structure directly adjoins the transponder chip. The junction may be situated laterally on the transponder chip or on the underside of the transponder chip. In all embodiments, the structure elements 30 in vertical projection onto the label or respectively the RFID transponder chip 10 are disposed laterally or respectively horizontally offset relative to the transponder chip 10. The at least one structure element 30 is disposed on the carrier substrate, as in the embodiments shown in FIGS. 5A and 5B, or on another foil course of the RFID label, as in the embodiments shown in FIGS. 1 to 4B.

The dot-shaped structure elements 30 shown in FIGS. 1 to 5B may be replaced by at least one structure element 30 that has a different geometric shape, for example one of the shapes shown in FIGS. 7A to 7C. Besides the shapes of the at least one structure element 30 shown in FIGS. 7A, 7B and 7C, further geometric shapes are also possible.

FIG. 7A shows an enlarged diagram of a vertical projection onto a region of the RFID label with the RFID transponder chip 10 and rectangular structure elements 30. The structure elements 30 may be formed as layers, which in the overhead view have a rectangular or alternatively thereto a square shape. The layers may be formed over the full surface. According to another embodiment, the structure elements 30 may be formed as rectangular or square frames.

FIG. 7B shows an enlarged diagram of a vertical projection onto a region of the RFID label with the RFID transponder chip 10 and at least one circular structure element 30. In the vertical projection onto the RFID label, for example, a structure element 30 may be disposed at a spacing around the transponder chip 10. The structure element 30 may be formed as a full-surface circular layer. According to another embodiment, in a vertical projection onto the RFID label, several circular structure elements 30 spaced apart from one another may be disposed at a spacing around the transponder chip 10. The structure elements 30 may be formed as layers, which in the overhead view have a circular shape.

FIG. 7C shows an enlarged diagram of a vertical projection onto a region of the RFID label with the RFID transponder chip 10 and frame-shaped structure elements 30. In the vertical projection onto the RFID label, a single structure element 30 in the form of a full-surface frame may be disposed at a spacing around the transponder chip 10. Alternatively thereto, in the vertical projection onto the RFID label, several circular structure elements 30 may be disposed spaced apart from one another and at a spacing around the transponder chip 10.

Although only a few embodiments of the present invention have been shown and described, it is to be understood that many changes and modifications may be made thereunto without departing from the spirit and scope of the invention.

LIST OF REFERENCE SYMBOLS

1 RFID label
10 Transponder chip
20 Carrier substrate
30 Structure elements
40, 41, 42 Foil course/Portions of the foil course
50 Antenna structure
60, 70 Adhesive layer

What is claimed is:

1. An RFID label with protection of the RFID function, comprising:
   an RFID transponder chip;
   a carrier substrate, on which the RFID transponder chip is disposed; and
   several structure elements;
   wherein the several structure elements, in vertical projection toward the RFID transponder chip, are disposed laterally offset relative to the RFID transponder chip; and
   wherein the several structure elements are disposed spaced apart from the RFID transponder chip and from one another and act as spacers so that, in a case of a mechanical stress on the RFID label, any forces acting on the RFID label are kept far away from the RFID transponder chip and are absorbed by the several structure elements.

2. The RFID label according to claim 1, wherein the several structure elements are disposed directly on the carrier substrate.

3. The RFID label according to claim 1, further comprising:
   at least one foil course disposed above the RFID transponder chip;
   wherein the several structure elements are disposed on the carrier substrate; and
   wherein the several structure elements are designed and disposed in such a way that the at least one foil course is disposed above the RFID transponder chip at a spacing that is determined by the height of the structure elements.

4. The RFID label according to claim 3, wherein the several structure elements hold the at least one foil course at the spacing above the RFID transponder chip.

5. The RFID label according to claim 1, further comprising:
   a first foil course and at least one second foil course;
   wherein the first foil course is disposed above the RFID transponder chip;
   wherein the at least one second foil course is disposed above the first foil course; and
   wherein the several structure elements are disposed directly on the first foil course.

6. The RFID label according to claim 5, wherein the several structure elements are designed and disposed in such a way that at least one region of the first foil course, which is situated between the several structure elements, is disposed spaced apart from the at least one second foil course.

7. The RFID label according to claim 6, wherein the several structure elements are designed and disposed in such a way that the second foil course is disposed above the region of the first foil course at a spacing that is determined by the height of the several structure elements.

8. The RFID label according to claim 1, wherein the RFID label is designed as a wraparound label for pasting onto a round body;
   wherein the wraparound label comprises a foil course with a first portion and with at least one second portion, which is adjoined in longitudinal direction of the label to the first portion; and
   wherein the several structure elements are disposed on an upper side of the first portion of the at least one foil course.

9. The RFID label according to claim 8, wherein the several structure elements are disposed on the upper side of the first portion of the at least one foil course;
   wherein the wraparound label is designed such that the second portion of the foil course is disposed above the first portion of the foil course after the pasting of the wraparound label onto the round body; and
   wherein the several structure elements are designed and disposed in such a way that at least one region of the first portion of the foil course, which is situated between the several structure elements, is disposed spaced apart from the second portion of the foil course, after the pasting of the wraparound label onto the round body.

10. The RFID label according to claim 9, wherein the several structure elements are designed and disposed in such a way that the second portion of the foil course is disposed, after the pasting of the wraparound label onto the round body, above the region of the first portion of the foil course at a spacing that is determined by the height of the several structure elements.

11. The RFID label according to claim 1, further comprising:
    a foil course disposed above the RFID transponder chip;
    wherein the several structure elements are disposed on an underside of the foil course;
    wherein the several structure elements are disposed on the underside of the foil course in such a way that a region of the foil course, which is situated between the several structure elements, is disposed at a spacing from the RFID transponder chip; and
    wherein the spacing is determined by the height of the several structure elements.

12. The RFID label according to claim 1, wherein the RFID label is designed as a wraparound label for pasting onto a round body;
    wherein the wraparound label is provided with a foil course, which is disposed above the RFID transponder chip;
    wherein the wraparound label is provided with the several structure elements disposed on an underside of the foil course;
    wherein the several structure elements are disposed on the underside of the foil course in such a way that a region of the foil course, which is situated between the several structure elements, is disposed at a spacing from the RFID transponder chip after the pasting of the wraparound label onto the round body; and
    wherein the spacing is determined by the height of the several structure elements.

13. The RFID label according to claim 1, wherein the several structure elements are formed from a lacquer.

14. The RFID label according to claim 1, wherein the several structure elements are designed as at least one platelet of rubber or caoutchouc or cork.

15. The RFID label according to claim 1, wherein the several structure elements have a respective height that is greater than the height of the RFID transponder chip.

* * * * *